April 30, 1968
J. T. McLAUGHLIN
3,380,073
PROTECTIVE DEVICE SUCH AS WELDER SHIELD
Filed Dec. 2, 1965
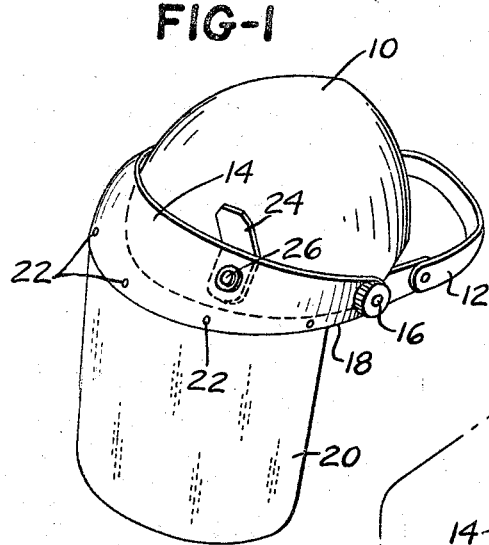
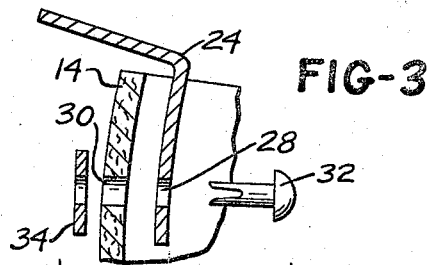
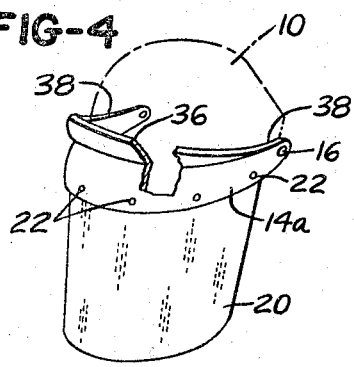
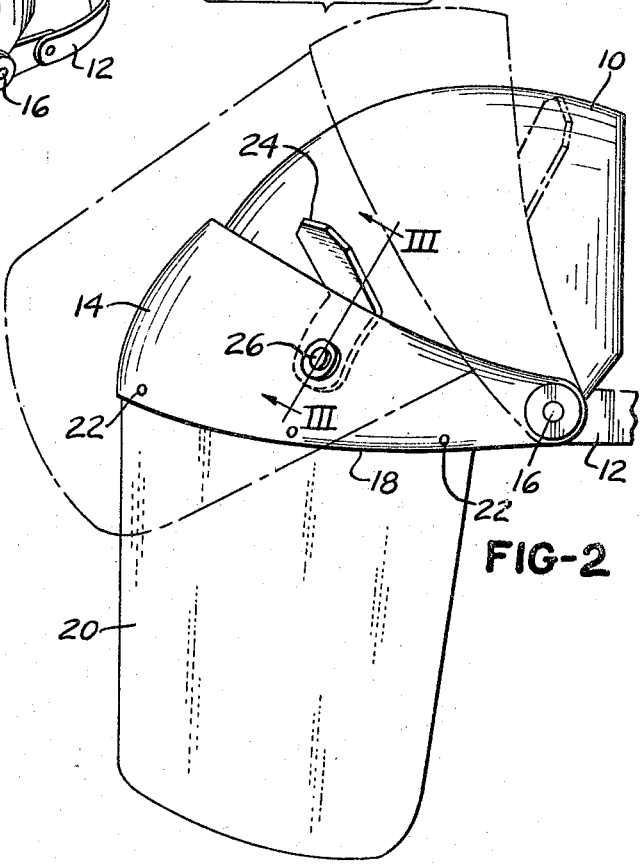
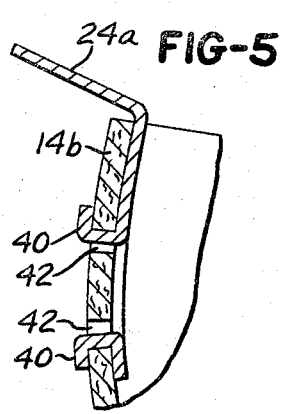
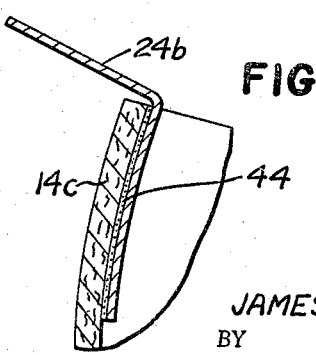
INVENTOR.
JAMES T. McLAUGHLIN
BY

United States Patent Office 3,380,073
Patented Apr. 30, 1968

3,380,073
PROTECTIVE DEVICE SUCH AS
WELDER SHIELD
James T. McLaughlin, 911 E. Kenton St.,
Springfield, Ohio 45505
Filed Dec. 2, 1965, Ser. No. 511,113
5 Claims. (Cl. 2—8)

The present invention relates to protective devices such as welding shields or helmets and the like and is particularly concerned with a shield or helmet of this nature which includes a tiltable face shielding portion.

Welding helmets, including the type having a tiltable face shielding portion are known and are employed by welders to protect the face from radiation from the welding arc and to protect the eyes from the brilliant light of the arc and to protect the face and eyes from flying sparks and weld spatter.

The intensity of the light from the usual electric welding arc are even from a gas welding flame is so intense that the material of the shield extending at least in front of the eyes is quite dark so that, while the welding arc or flame can be observed therethrough, in the absence of the arc or flame, there is little, if anything that can be seen through the aforementioned portion of the shield.

Because of the density of the said portion of the shield, it is necessary, when the welder is required to move workpieces about or is required to manipulate tools or the welding gun, to tilt the face shielding portion upwardly so that the welder can observe what he is doing. The usual procedure, when an electric arc is to be struck, is to position the welding gun in about working position, and then to tilt the face shielding portion downwardly into protective position, and thereafter to strike the arc and proceed with the welding work which is in a region now illuminated by the struck arc.

Due to the flying sparks and weld spatter and intense tomary for the welder to wear heavy gloves or pads on his hands for protective purposes. The manipulating of small tools and the tilting upwardly of the face shielding portion thus can become rather difficult on account of the bulky hand covering. For tilting the face shielding portion upwardly, the welder usually grasps a corner thereof and tilts the said portion upwardly and, when the face shielding portion is to be tilted downwardly, the face shielding portion is again grasped and tilted downwardly into protective position.

Since the face shielding portion is normally a relatively thin plastic material it will be evident that the face shielding portion can become twisted or broken or otherwise damaged in this operation and, also, grasping of a corner thereof with the heavily gloved or padded hand is inconvenient and is sometimes difficult so that considerable time may be lost during a welding operation merely in tilting the face shielding portion upwardly and downwardly.

With the foregoing in mind, it is a primary objective of the present invention to provide a welders shield of the nature referred to in which the tilting upwardly and downwardly of the face and eye covering or shielding portion thereof can readily be accomplished even though the welders hand is covered with a relatively heavy glove or pad.

Another object of this invention is the provision of a device for attaching to a welder's shield having a tiltable face and eye protective portion which is easy to apply to existing shields or helmets and which can readily be incorporated in shields or helmets of new manufacture as well.

A still further object of the present invention is the provision of a device of the nature referred to which is quite inexpensive and which can readily be attached to the shield or helmet for use by either right handed or left handed welders, as may be desired.

The objects referred to above as well as still other objects and advantages of the present invention will become more apparent upon reference to the following detailed specification taken in connection with the accompanying drawings in which:

FIGURE 1 is a perspective view of a typical welders helmet or shield of the nature with which the present invention can be employed;

FIGURE 2 is a side elevational view of the shield or helmet drawn at somewhat enlarged scale;

FIGURE 3 is a section indicated on line III—III of FIGURE 2 but showing the device according to the present invention in the process of being assembled with a helmet or shield;

FIGURE 4 is a perspective view similar to FIGURE 1 but shows a modification;

FIGURE 5 shows a modified manner of attaching the device of the present invention to a welding shield or helmet; and FIGURE 6 shows another manner in which the device can be attached to the shield or helmet.

Referring to the drawings somewhat more in detail, in FIGURE 1 the shield or helmet comprises a top portion 10 adapted for covering the frontal portion of the welders head. A band 12, preferably adjustable in length, forms a part of the structure so that the helmet or shield can be supported on the welders head.

At the front of top portion 10 is a substantially semi-circular tiltable support member 14, pivotally connected to top portion 10 as by the pivot means 16. The lower edge 18 of member 14 is generally horizontal as will be seen in FIGURE 1, and dependant therefrom is as arcuate shield member 20, connected thereto as by bolts or rivets 22 and serving to protect the face, eyes and upper neck portion of the welder from radiation, sparks, weld spatter, heat, and intense light.

Member 20 is a plastic material, quite dark in color so that normally very little light will pass therethrough but having a relatively high degree of transparency to the brilliant light of a welding arc. When the member 20 is disposed in front of the welders face, he can see little, if anything, except the welding arc and the region immediately surrounding the welding arc which is illuminated thereby. For the reason that visibility through member 20 is quite poor, when the welder wishes to observe the work to be done in the absence of illumination from the welding arc, members 14 and 20, forming the face shielding portion of the shield, are tilted upwardly about piovt means 16. Normally, the member 20 itself is availed of for tilting the members 14 and 20 upwardly but, according to the present invention, a clip 24 is secured as by bolt or rivet means 26 to member 14 at the upper edge thereof and can be employed for effecting the aforementioned tilting. Clip 24 can be arranged at any convient place along the edge of member 14 and is advantageously located at one side or the other of the center depending upon whether the welder is right handed or left handed. A central location of the clip 24 on member 14 is of course possible which would make the shield universal for both right and left handed welders. Normally, however, the clip would be positioned to one side or the other of center, depending on which hand of the welder was not holding the welding gun.

As will be seen in FIGURES 2 and 3 clip 24 can be a simple angular metal clip having a hole 28 therein for registration with the hole 30 in member 14 and through which holes can be placed a rivet 32 which passes through the clip 24 of member 14 and, preferably, also through a washer 34 whereupon the rivet can be flattened or expanded and thus fixedly connect clip 24 to member 14. The material of member 14 is usually a fairly dense heavy fiber board of a non-inflammable nature and the described attaching means for clip 24 will provide quite solid support therefore.

It is also contemplated, within the purview of this invention to form member 14 as a molded article. Thus, in FIGURE 4, part 14a, to which member 20 is attached, may be a molded member and, to provide this member with clip means for tilting the member, projection or extension means easily engageable by a sweep of the welders gloved hand past the upper portion of the tiltable part of the shield, member 14a is provided with an angularly extending integrally molded rib or projection part 36. This part preferably tapers at the sides as at 38 so that there is no fragile rib portion extending laterally from the helmet or shield. The portion of the rib structure intermediate the extreme sides of member 14a projects outwardly from member 14a at an angle sufficiently far to readily be engaged by the welders gloved hand upon sweeping it upwardly past the shield or helmet.

FIGURE 5 shows how a clip 24a could be provided having a pair of tongues 40 struck out therefrom and receivable in holes 42 provided in the tiltable portion 14 of the helmet which corresponds to member 14 of FIGURES 1 to 3. In assembling clip 24a with portion 14b of the shield or helmet, the tongues 40 are extended through holes 42 and are then simply bent over or hammered down to the position illustrated in FIGURE 5.

In FIGURE 6, clip 24b is connected to member 14c of the helmet by adhesive 44 interposed therebetween. This adhesive can be of any well known type, epoxy resin for example, or it may be in the form of a pressure sensitive adhesive applied between the members in the form of a tape, or provided directly on clip 24b. In this last mentioned case, clip 24b will be provided with layer of pressure sensitive adhesives 44 and a thin cover strip would cover the adhesive, according to well known practices, and which strip would be torn off at the time of connecting clip 24b with portion 14c of the shield or helmet.

It will be understood that the particular attaching means for the clip can be varied considerably and that the important feature of the present invention is the provision of means associated with the tiltable portion of a welders helmet or shield of the nature disclosed for enabling the welder wearing the helmet or shield readily to tilt the face covering portion of the shield upwardly and downwardly so as to save time in the welders work while at the same time considerably extending the life of the shield or helmet by protecting the rather fragile face protecting plastic portion thereof from damage by the gloved hand of the welder.

The preceding description has been directed particularly to a welders shield but there are other protective devices of the tilting face shield type with which the present invention can be employed with equal merit.

For example, protective devices of the nature described having tiltable clear face shield portions are employed by the operators of grinding machines and other devices in situations where the face and eyes must be protected from flying particles but no need exists to protect the face or eyes from any sort of radiation.

The present invention permits the tiltable portion of the device to be raised and lowered without touching the plastic shielding element by the hand or glove thereby preventing the plastic element from becoming abraded, deformed, or broken.

Still further, in connection with both welders protective devices, having dark shield elements, and other protective devices, having clear shield elements, the present invention prevents soiling of the shield element from the hand or glove, which soiling is objectionable for optical reasons and may also lead to deterioration of the material of the shield element.

It will be understood that this invention is susceptible to modification in order to adapt it to different usages and conditions; and accordingly, it is desired to comprehend such modifications within this invention as may fall within the scope of the appended claims.

What I claim is:

1. A protective device for protecting the face and head of workmen such as, welders and the like comprising; a face shielding portion adapted to be disposed in front of the workman's face and including at least a portion in the region of the workman's eyes through which an arc or the like can be observed, a band adapted to support the device on the workman's head and means pivotally supporting said face shielding portion on said band for tilting movement between lowered face protecting position and tilted up face exposing position, and angular clip means mounted on and projecting outwardly from said face shielding portion at the top edge of said face shielding portion from a point to one side of the center of said face shielding portion, said clip means projecting outwardly from said face shielding portion such a distance as to be readily engageable by the hand of a workman wearing the device upon a sweeping motion of the workman's hand along a path adjacent the device in the lateral region of said clip means whereby the face shielding portion can be moved by the workman from lowered to tilted up position and vice versa without soiling of said face shielding portion.

2. A protective device according to claim 1 in which said band toward the front thereof includes a concave member adapted to cover the frontal portion of the workman's head and said face shielding portion includes a curved member at the top disposed in relatively close parallel relation to said concave member, and means connecting said projecting means to said curved member.

3. A protective device according to claim 2 in which said connecting means is a fastener extending through said clip means and curved member.

4. A protective device according to claim 2 in which said connecting means is adhesive.

5. A protective device according to claim 2 in which said curved member has aperture means therein, and said clip is metal, and said connecting means is in the form of tabs stuck out from said clip and extending through said aperture means in the curved member and bent over to fix the clip to the curved member.

References Cited

UNITED STATES PATENTS

| | | | |
|---|---|---|---|
| 1,833,741 | 11/1931 | Diehl | 2—10 |
| 2,033,691 | 3/1936 | Douglass | 2—174 |
| 2,194,492 | 3/1940 | Bowers | 2—8 |
| 2,244,457 | 3/1951 | Harrington | 2—8 |
| 2,867,812 | 1/1959 | Roth et al. | 2—6 |
| 2,881,443 | 4/1959 | Barker | 2—9 |

JORDAN FRANKLIN, *Primary Examiner.*

JAMES R. BOLER, *Examiner.*